Nov. 24, 1953
C. J. SCRANTON
MANURE SPREADER
2,660,439
Filed March 3, 1950
3 Sheets-Sheet 1
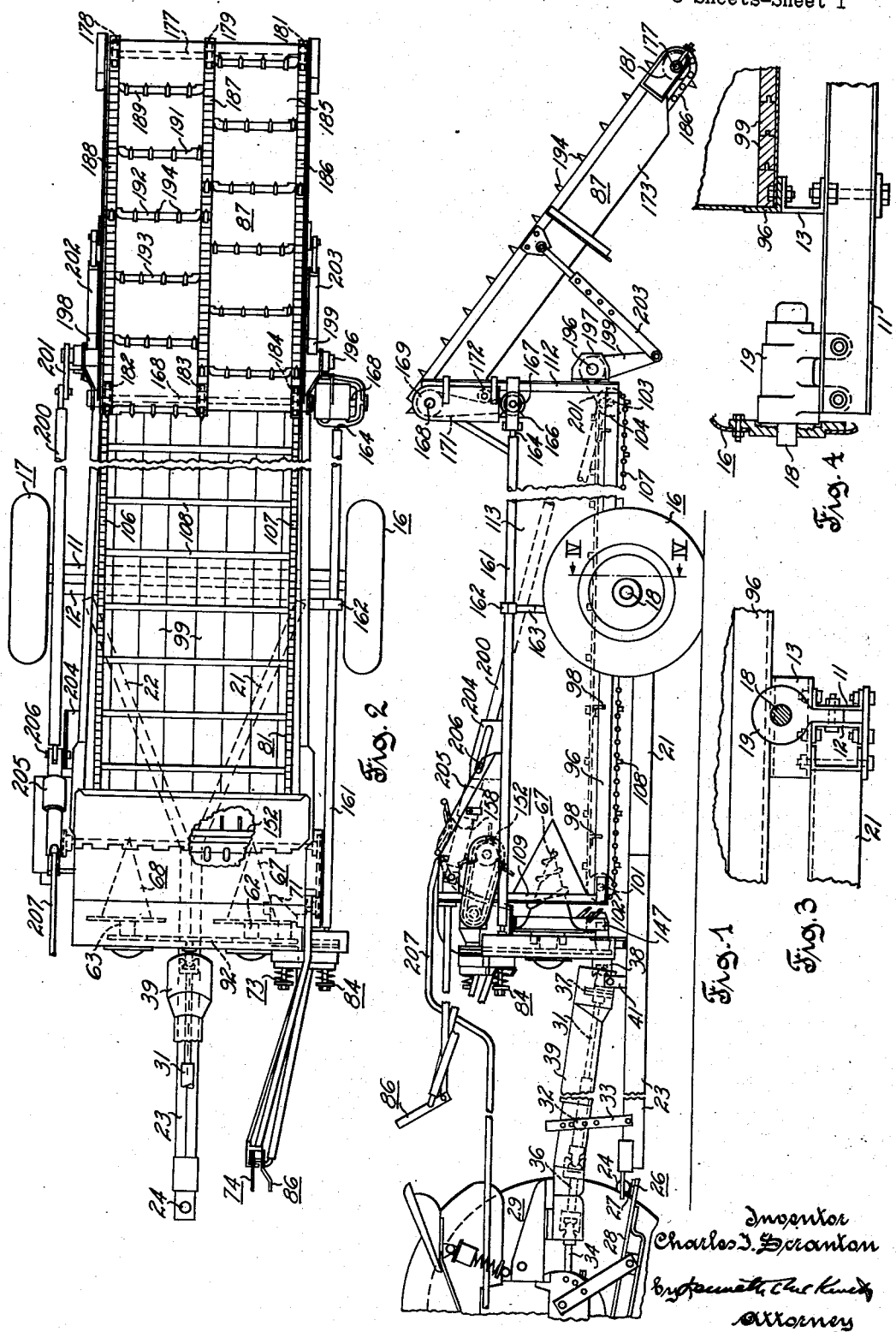

Nov. 24, 1953     C. J. SCRANTON     2,660,439
MANURE SPREADER

Filed March 3, 1950     3 Sheets-Sheet 2

Inventor
Charles J. Scranton

Nov. 24, 1953 — C. J. SCRANTON — 2,660,439
MANURE SPREADER
Filed March 3, 1950 — 3 Sheets-Sheet 3
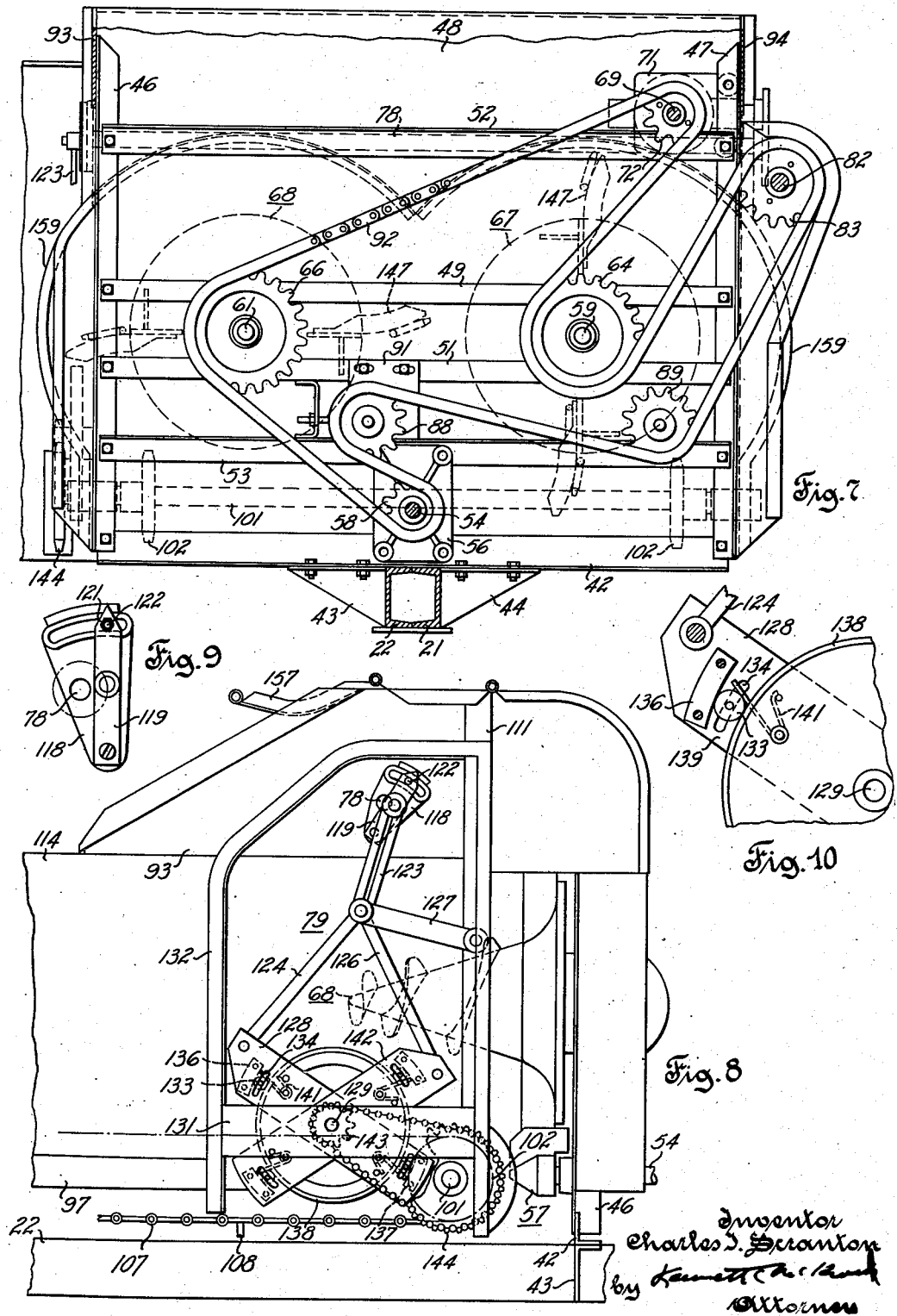

Patented Nov. 24, 1953

2,660,439

UNITED STATES PATENT OFFICE 2,660,439

MANURE SPREADER

Charles J. Scranton, La Porte, Wis., assignor to Allis-Chalmers Manufacturing Company, Milwaukee, Wis.

Application March 3, 1950, Serial No. 147,391

7 Claims. (Cl. 275—1)

This invention relates generally to a tractor propelled fertilizer or manure distributor of the type utilizing conveying and spreading elements operated by power derived from the engine of the tractor, and is more particularly concerned with and directed toward the provision of a distributor incorporating features designed to improve the structural and functional coaction of parts in a manner affording material advantages as to loading, conveying and/or spreading operations.

Loading manure from a pile into a spreader has been one of the more arduous and unpleasant tasks connected with farm work. And while attempts have been made to alleviate some of this work by mounting a scoop shovel or suitable loading device on the front end of the tractor, these devices have not solved the problem adequately as most farmers have but one tractor and the mounting of such a device thereon materially limits maneuverability and utility. Consequently, attachment and removal of the loading device is quite frequent and requires considerable time and effort for each such operation. Moreover, the spreader will have to be detached from the tractor each time the tractor mounted loader is utilized for filling the body of the spreader and in addition, after the spreader is filled, the tractor, with the loader still attached, will then have to be reengaged with the spreader and utilized to draw the spreader through the fields in the spreading operation.

It is, therefore, the principal object of this invention to provide a self-loading power take-off operated distributor wherein the distributor is loaded through power derived from the tractor and wherein the distributor remains coupled to the tractor during the loading operation.

Another object of this invention is to provide a front spreading fertilizer distributor having a self-loading device operatively mounted on the rear end thereof whereby the distributor may be backed into a loading position against a manure pile or into contact with manure on the ground or floor such as found in a steer feeding lot or shelter and the loading thereof effected by operating said device.

Another object of this invention is to provide a manure distributor wherein the manure is uniformly distributed in substantially vertical transverse planes at the front end of the distributor.

Another object of this invention is to provide a tractor drawn, power take-off operated, balanced two wheeled fertilizer distributor wherein the load distribution is such that any thrust exerted on the traction wheels of the tractor during distribution is downward regardless of the percent load of the distributor.

Another object of this invention is to provide a front spreading fertilizer distributor having a pair of slingers oppositely rotating in a vertical plane wherein the fertilizer is supplied to the slingers by a conveyer and over a beater.

Another object of this invention is to provide a low cost, rugged, two wheeled manure distributor which can be readily converted into a trailer having a power take-off connection, for use as desired.

Another object of this invention is to provide a manure distributor that will pick up heavily packed manure and distribute it in the form of an ideal top dressing free from chunks.

The construction and operation of apparatus embodying the invention will become readily apparent as the disclosure progresses and particularly points out additional features and advantages considered of special importance. And accordingly, the invention may be considered as consisting of various details of construction, correlation of elements and arrangements of parts as is more fully set forth in the following description, reference being had to the accompanying drawings, in which:

Fig. 1 is a side elevation of a fertilizer distributor and loader embodying the invention;

Fig. 2 is a plan view of the fertilizer distributor and loader shown in Fig. 1;

Fig. 3 is an enlarged detail of Fig. 1 with the left hand wheel removed;

Fig. 4 is an enlarged detail taken on line IV—IV of Fig. 1;

Fig. 7 is a view taken on line VII—VII of Fig. 5;

Fig. 8 is an enlarged view of part of the right hand side of the distributor;

Fig. 9 is an enlarged view of the variable feed drive mechanism hown in Fig. 8; and Fig. 10 is an enlarged view of a detail of the drive mechanism shown in Fig. 8 with some parts removed for clarity.

Figure 5:
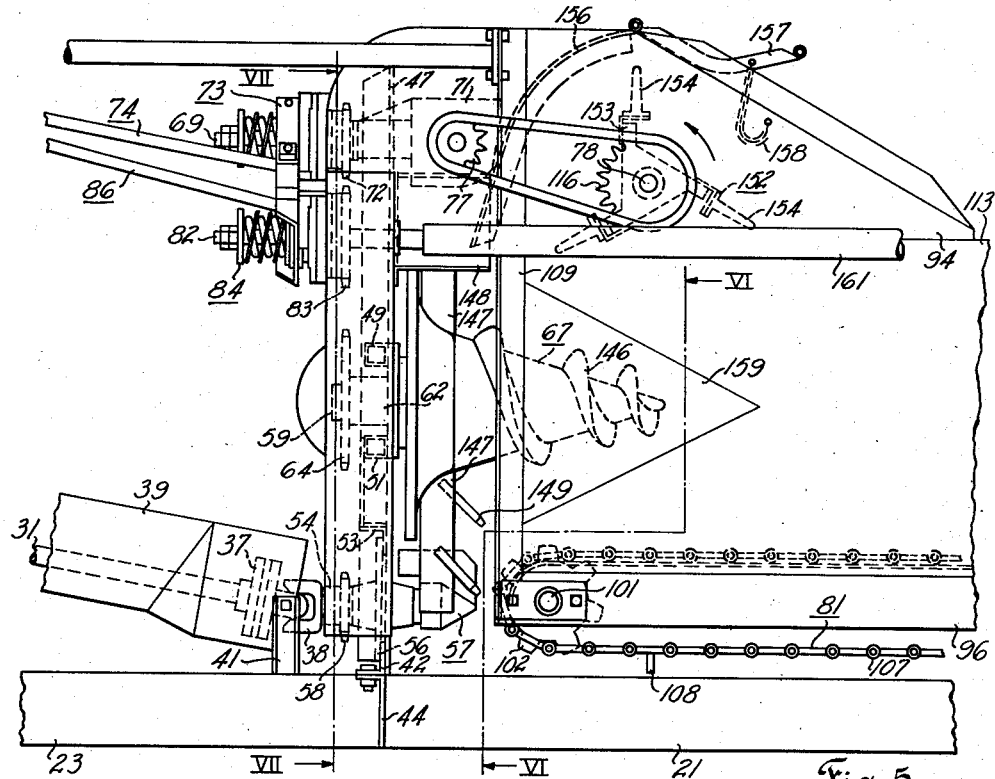
Fig. 5 is an enlarged view of a portion of the left hand side of the distributor.

Referring to Figs. 1 and 2 of the drawings, it is seen that a self-loading manure spreader embodying the invention may include a supporting frame structure having a pair of transversely extending channel members 11, 12 joined in spaced apart relation by means of a pair of transversely spaced longitudinally extending support members 13 (see Fig. 3) with the flanges of each channel member extending outwardly away from the adjacent channel member. Ground engaging wheels 16 and 17 have their stub shafts 18 journaled in housings 19 positioned between and attached to the ends of channel members 11 and 12 by conventional means as shown in Figs. 3 and 4. Extending diagonally forward from support members 13 are channel irons 21 and 22 which are joined at a forward point, lying in a plane including the longitudinal center line of the spreader as by welding with the flanges of channel members 21 and 22 extending toward each other. The forward portions of channel irons 21 and 22 are bent and joined together to form a longitudinally extending tongue portion 23 to which a socket half 24, of a ball and socket hitch 26 of the type shown in U. S. patent to Harrer, No. 2,438,749, issued March 30, 1948, is attached at the end thereof. The ball 27 of the hitch is attached to the drawbar 28 of a tractor 29 which is preferably of the type having a live power take-off. From the foregoing, it is seen that a simple, durable two wheeled trailer has been provided, which can be utilized independently of the spreader to mount a variety of apparatus.

Tongue member 23 rotatably supports a telescoping shaft 31 by means of a bearing 32 carried by and between strap members 33 (only one of which is shown) which are pivotally attached at their lower ends to tongue member 23. The forward end of shaft 31 is adapted to be drivingly connected to a power take-off shaft 34 of a tractor or other power source by means of a shaft member 36 having universal connections on the ends thereof. The rear end of shaft 31 is connected by means of an overload clutch 37 to a universal connection 38 adapted to be joined with any mechanism it may be desired to mount on the two wheeled trailer. Shaft 31 is enclosed by a safety shield 39 attached to straps 33 and to flange 41 carried by tongue member 23. It is, therefore, seen that a two wheeled trailer has been provided with power take-off means which can be connected to a propelling vehicle to operate and transport any mechanism mounted on the two wheeled trailer.

Referring to Figs. 5 and 7 it is seen that a transversely extending angle member 42 is attached to gusset plates 43 and 44 which are joined to tongue member 23 as by welding. Vertically extending angle irons 46 and 47 are attached to the ends of transverse angle member 42 and are additionally spaced apart by vertical plate 48, by transverse tube members 49 and 51 and by transverse angle irons 52 and 53. A power input shaft 54, connected to telescoping shaft 31 by means of universal connection 38, is rotatably journaled in bearing member 56 carried by angle members 42 and 53. On the rear end of shaft 54 an impeller member 57 is attached whose function is to prevent an accumulation of manure on the portion of tongue member 23 located immediately below the impeller member. A sprocket member 58 is attached to the forward end of shaft 54 for rotation therewith. A pair of slinger shafts 59 and 61 are rotatably journaled in bearings 62 and 63, respectively, carried by transverse tubes 49 and 51. Sprockets 64 and 66 are attached to the forward ends of slinger shafts 59 and 61, respectively, while cone shaped slingers 67 and 68 are attached to the rear ends of shafts 59 and 61, respectively, for rotation therewith. A shaft 69 is journaled in a bearing supported in a gear housing 71 carried by angle iron 47 and by transverse angle member 52. A sprocket 72 is mounted on shaft 69 and by means of a combination clutch 73 sprocket 72 may be engaged with shaft 69 to drive same. Clutch 73 is of conventional design and includes an overload jaw clutch (not shown) and a manually operated pin clutch (not shown) which latter clutch is operable from the seat on tractor 29 by means of hand lever mechanism 74. The rear end of shaft 69 is gear connected within gear housing 71 to drive a sprocket 77 which is the power supplying means for beater shaft 78 and for the drive mechanism 79 (see Fig. 8) for the floor conveyer 81, which drive means will be described at a later point. A shaft 82 (see Figs. 5 and 7) is journaled in a bearing support member (not shown) carried by vertical angle member 47. A sprocket 83 is mounted on shaft 82 and by means of a combination clutch 84 similar to clutch 73, sprocket 83, by means of hand lever mechanism 86 and a pin clutch (not shown), may be engaged with shaft 82 for driving same. The rear end of shaft 82 is connected by means of power transmitting elements to drive loading conveyer 87, the details of which will be described at a later point. A pair of idler sprockets 88 and 89 are rotatably supported between tube member 51 and angle member 53. Conventional chain tightening means are provided permitting transverse movement of plate 91 which rotatably supports sprocket 88. A chain 92 driven by sprocket 58 interconnects sprockets 58, 66, 72, 64, 83, 88 and 89 and drives same. It should be noted that sprockets 64 and 66 are driven in opposite directions.

The body of the distributor is attached at a midportion thereof to channel members 11 and 12 by means of bracket 13 (see Fig. 4). The forward end of the body is supported from channel members 21 and 22 by means of longitudinally extending plates 93 and 94 which are attached to the upper portion of the body and to vertically extending angle members 46 and 47. The body of the spreader is a box-like structure having an open top and forward end. The bottom of the box includes a pair of longitudinally extending angle irons 96 and 97 connected by several transversely extending angle members 98. The floor of the spreader includes wooden members 99 attached to transverse angle members 98. At the forward ends of angle members 96 and 97, a shaft 101 carrying a pair of sprockets 102 is rotatably journaled. A shaft 103 is attached to the rearward ends of angle members 96 and 97 and sprockets 104 are journaled on shaft 103 for rotation relative thereto. An endless conveyer having chains 106 and 107 connected by slat members 108 passes around these sprockets and around the floor of the spreader. Conventional means are provided for moving shaft 103 forwardly or rearwardly to adjust the tension in chains 106 and 107. Attached to the forward ends of angle members 96 and 97 are vertically extending angle irons 109 and 111, respectively, which are joined at their upper portions to plates 94 and 93, respectively. Attached to the rear ends of angle members 96 and 97 are vertical angle members 112 (only one of which is shown). A side member 113 is attached to angle members 109, 96 and 112 and the opposite side member 114 is attached to angle members 111, 97 and 112. An end member is attached to angle irons 112. It should here be noted that the body of the spreader tapers wideningly forward. The purpose of this is to make it easier for the conveyer 81 to move the load of manure in the box forwardly toward the slingers without compacting same.

Beater drive sprocket 77 is chain connected to sprocket 116 attached to beater shaft 78 which is journaled in side plates 93 and 94. On the right hand end of beater shaft 78 is attached a conveyor drive cam 118 (see Figs. 8 and 9). Pivotally attached to one end of drive cam 118 is an arm 119 having its other end pointed to form an indicator. Adjacent the pointed end, a nut 121 and bolt 122 are provided for rigidly connecting cam 118 with arm 119 to prevent relative movement. When nut 121 is loosened arm 119 may be moved in a vertical plane relative to cam 118. Pivotally attached to a midportion of arm 119 is a link 123 which is pivotally attached at its other end to drive links 124 and 126 and to guide arm 127 which is pivotally attached at its opposite end to vertical angle iron 111. Drive link 124 is pivotally connected to a pair of plates 128 which are pivotally mounted on a shaft 129 which is journaled in side member 114 of the spreader and in a support member 131 carried by a cover frame 132 attached to side wall 114 of the spreader. A pair of rollers 133 having reduced end portions are freely received within arcuate slots 134 in both ends of plates 128. These arcuate slots have a center coinciding with the center of shaft 129. Attached to plates 128 adjacent these arcuate slots (see Figs. 8 and 10) are blocks 136 and 137. Between plates 128 a drive wheel 138 is mounted. Drive wheel 138 is attached to shaft 129 for driving same. As can be seen in Fig. 10, roller 133 is positioned between the periphery of wheel 138 and block 136. The surface of block 136 that is contacted by roller 133 is not concentric with the periphery of wheel 138 in that the lower portion of the block as viewed in Fig. 10 is closer to the periphery of wheel 138 than the upper portion is, thus providing a wedge shaped recess 139 into which the roller is pressed when the plates move in a clockwise direction. Each plate 128 mounts a pair of springs 141 which bias rollers 133 into the wedge shaped recess 139 between wheel 138 and block 136. It should be noted that block 137 attached to the lower portion of plates 128 is positioned so that its upper portion is closer to wheel 138 than its lower portion and block 137 functions in the same manner as block 136 so a further description of this is considered unnecessary. It is believed unnecessary to describe the details of plates 142 which are pivotally connected to the lower end of drive link 126 as these plates are similar in construction to the previously described plates 128 and the slots, rollers, wedges and springs thereof are similarly constructed.

It should now be obvious that as beater shaft 78 rotates, link 123 moves up and down. Arm 127 serves only as a guide for link 123 and the end connected to the link moves up and down therewith. Plates 128 and 142 which carry the drive rollers 133 oscillate about shaft 129 as their common center. When plates 128 move in a clockwise direction (as viewed in Figs. 8 and 10), the rollers 133 are being forced in a counterclockwise direction by coil springs 141 which wedge the rollers between the blocks and the wheel thus providing the means for imparting clockwise motion to the drive wheel 138 from beater shaft 78. Similar design is incorporated in plates 142 and its related parts except that it drives wheel 138 in a clockwise direction as viewed in Fig. 8 on the downstroke of link 123 while plate 128 drives wheel 138 on the upstroke thus providing a continuous drive for the wheel 138 for each turn of the cam 118. Attached to drive wheel 138 is a sprocket 143 which is chain connected to sprocket 144 attached to the end of conveyor shaft 101. This drive mechanism, as can be seen from Fig. 8, provides a continuous drive for the conveyor 81 and which drive can be varied in any increments desired over a wide variation merely by adjusting arm 119 relative to cam 118 and thereby moving the upper end of link 123 closer to or farther away from the center of beater shaft 78 and thereby varying the throw of the cam.

Figure 6:
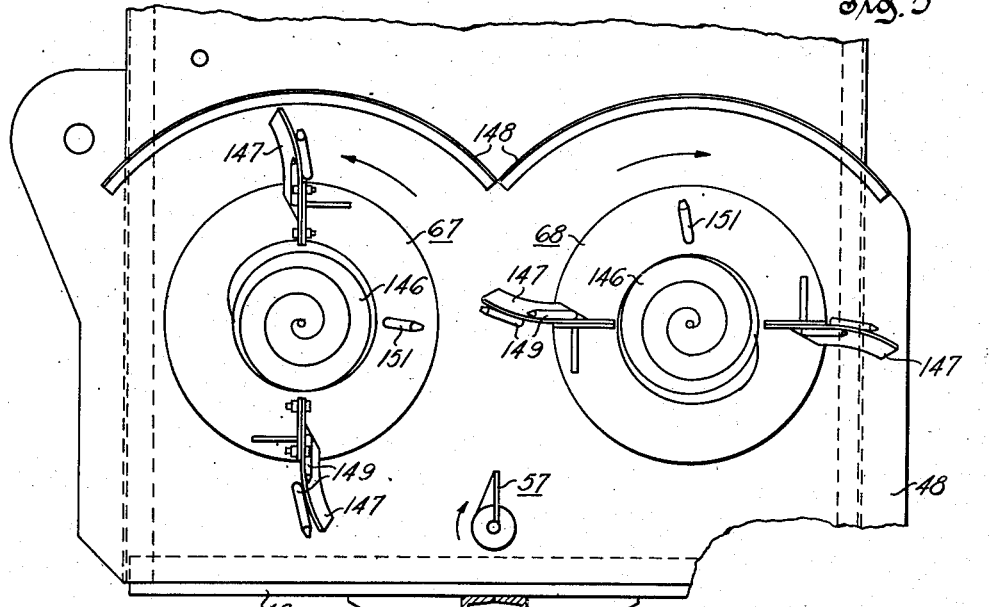
Fig. 6 is a view taken on line VI—VI of Fig. 5.

In the ordinary type of ratchet drive the speed thereof cannot be varied within the increment set up by one tooth, whereas with the previously described drive there is no such limitation of increment. The aforesaid drive mechanism for the conveyor is described herein only for purposes of illustrating a drive mechanism and any of the prior art types of power take-off drive may be substituted therefor. The pair of conical slingers 67 and 68 which are attached to and driven by shafts 59 and 61, respectively, each have a feeding rib 146 spirally attached thereto (see Figs. 5 and 6) which function to move manure into the forward end of the slingers. The slingers include a pair of diametrically oppositely mounted blade members 147 curved slightly outwardly towards the direction of rotation as is indicated in Fig. 6. It is to be noted that the slingers revolve in opposite directions as indicated in Fig. 6. Above the slingers is mounted a slinger shield 148 which is attached to plate 48. This shield prevents manure particles from flying upwardly. Attached to each curved blade member 147 are spike like elements 149 which aid in breaking up and shredding large pieces of manure which have not been shredded previously. A similar spike 151 is also attached to a forward portion of the cone of the slinger and its function is also to tear up large pieces of manure.

The specific details of the conical feeders are herein described for the purpose of illustration only as any pair of vertical slingers having shredding means incorporated therein may be substituted therefor. Reference is here made to the copending application of Rector C. Fergason for Manure Spreader Feeding Device, Serial No. 157,155, filed April 20, 1950, now U. S. Patent 2,626,809, in which the conical feeder means, herein described, is disclosed and claimed.

A manure beater and shredder 152 is attached to beater shaft 78 and has equally spaced transversely extending members 153 extending therefrom. Each member 153 has a series of fingers 154 attached thereto for beating, shredding and transferring the upper portion of the manure load thereover and onto the slingers. Attached to the outer edge of slinger shield 148 is a beater shield 156 which is attached at the sides thereof to plates 93 and 94. Beater shield 156 curves upwardly and rearwardly away from the slinger shield and has hinged on the upper edge thereof a floating shield 157 whose counterclockwise motion as viewed in Fig. 5 is limited by chains 158 which are attached to side plates 93 and 94. The beater shield and floating shield form a guide for directing manure passing over the beater onto the slingers. The floating shield is hinged so that if the manure is piled high the rearward portion of the shield will float on top of the pile as limited by the chain attached thereto. The beater lifts the top portion of the manure moving toward it up over the beater and onto the slingers thereby helping to avoid compacting of the manure and ensuing jamming.

It should also be here noted (see Fig. 5) that the sides 113 and 114 of the spreader box are flared out adjacent the slingers in a semi-conical form 159. The purpose of this configuration is to prevent jamming of the manure just prior to the spreading operation. The increased space afforded by these flared out portions is substantially equal to the space occupied by the portion of the conical slingers which overlay the floor of the spreader. Or in other words as the manure moves forwardly over the floor of the spreader and is contacted by the slingers, the space occupied by the slingers does not cause the manure to become compacted as there is adequate room for the manure to spread out into the flared portion of the sides of the spreader. In addition, of course, the previously mentioned fact that the box of the spreader is larger toward the front end also helps to provide additional space in preventing compacting of the manure adjacent the slingers.

Shaft 82 is connected to a hollow shaft 161 as by welding (see Figs. 1 and 2). This hollow shaft is journaled in a bearing 162 which is carried by a bracket attached to a vertical frame member 163 carried by side 113 of the box. The rear end of shaft 161 is joined to a solid shaft 164 which is journaled in a bracket supported on the upper rear portion of the spreader box. Shaft 164 has attached thereto a bevel gear 166 which is meshed with a bevel gear attached to a sprocket 167. A transversely extending shaft 168 is rotatably supported in bearings carried by the upper ends of vertical angle members 112. A sprocket 169 attached to shaft 168 is drivingly connected to sprocket 167 by means of chain 171 which is conventionally tightened by means of an idler sprocket 172. A loading conveyer 87 comprises an elongated rigid elevator frame which includes side members 173 and is pivotally suspended from a rear top portion of the vehicle body for vertical swinging movement in rearward depending relation thereto. Attached to the lower ends of side members 173 is a transverse shaft 177 having sprockets 178, 179 and 181 journaled thereon. Upper shaft 168 has sprockets 182, 183 and 184 attached thereto. A conveyer floor 185 is attached between side members 173 and the ends of this floor curve around shafts 168 and 177. Portions of floor member 185 are removed to avoid interference with the sprockets on shafts 168 and 177. Trained around the upper and lower conveyer shafts and around floor member 185 is a spiked endless belt structure having three chains 186, 187 and 188. Chain 186 passes around sprockets 181 and 184, chain 187 passes around sprockets 179 and 183 and chain 188 passes around sprockets 178 and 182. Chains 187 and 188 are connected by transversely extending slats 189, 191, 192 and 193. It should be noted that these individual slats join only two of the chains and that chains 186 and 187 are similarly connected by slats which are alternately spaced. In this manner overloading of the conveyer is avoided. Often the manure is partly frozen or trampled down particularly in a feeding lot or shelter so that a considerable strain is placed upon the loading structure when the slats contact relatively solid immovable material. Each slat is provided with spike like projections 194 for digging into the manure. An examination of Fig. 2 will show that these spikes 194 vary in their location on the different slats. For example, the spikes on slat 189 are in the same location as on slat 193 and the spikes on slat 191 are in the same location as the spikes on the slat above slat 193. In this manner, as the loading slats move about the loading floor and contact the manure, substantially all portions of the manure in line with the slats are ultimately contacted by a spike. And in not having the spikes all placed on the slats in longitudinal alignment with the spikes on adjacent slats, the pile is broken up and shredded rather than just having grooves dug therein with little or no manure being loaded.

A rock shaft 196 is pivotally mounted in brackets 197 attached to angle members 112 of the distributor box. Attached to rock shaft 196 are three arms 198, 199 and 201. Arms 198 and 199 are pivotally connected to telescoping members 202 and 203, respectively, which are pivotally attached at their other ends to side plates 173. Arm 201 is pivotally attached to a link 200 which is pivotally connected to hydraulic ram 205 carried by side plate 93. On the upper edge of side member 114, a bracket 204 having a slot therein is attached. An extension of the pin 206 connecting the hydraulic ram with link 200 extends into this slot which functions as a guide member for the pin. Hydraulic ram 205 has a hydraulic connection 207 adapted to be connected with the hydraulic pump (not shown) on the tractor 29.

*Operation*

The operation of the manure spreader is as follows, assuming that the spreader is empty, that the feed cam 118 has been adjusted for the desired amount of spreading and it is desired to fill the spreader and to distribute the manure. The spreader is backed until the lower end of the loading conveyor 87 is in contact with a manure pile or in contact with manure on the ground of a steer feeding lot or shelter. The position of the lower end of the conveyor can be controlled by the tractor operator manipulating the controls of the hydraulic pump on the tractor. If the range of motion of the lower end of the conveyor is not best adapted for handling the particular manure, a different range of motion can be obtained by lengthening or shortening the telescoping supports 202 and 203. Assume that when the spreader was backed into the manure that the slingers, beater and floor conveyor were in operation, then to start the loading conveyor clutch 84 is engaged by the tractor operator manipulating handle 86. The manure now moves up the conveyor and drops onto the bed of the distributor. The conveyor 81 in the distributor moves the manure forward and this operation can be continued until the body of the spreader is filled if the tractor operator keeps the spreader backing into the manure to furnish an adequate supply for the elevating conveyor. When the spreader is filled, the tractor operator reaches back and disengages the loader clutch and the spreader clutch and activates the hydraulic controls to raise up the loading conveyor. Then the spreader can be pulled to the field, the spreader clutch reengaged and the spreading done.

The aforegoing description of operation assumes that the operator is working under ideal conditions; however, such is usually not the case, but with the hydraulic controls for the loading conveyor positioned for finger tip control and with the driver's ability to keep the loading conveyor in a proper pick up position by positioning the tractor closer to the manure, the loading can be done easily in a short time without a great deal of effort.

If need be the spreader clutch can be disengaged while part of the loading is being done such as in a situation when the manure is spread out on the ground as in a feeding barn and it is difficult to keep the loading conveyor supplied with an adequate amount of manure.

It should here be noted that this two wheeled self-loading fertilizer distributor is so constructed and arranged that the center of gravity thereof uniformly remains forwardly of the wheels thereof at all times during distributing, thereby providing a downward thrust on the tractor to which it is hitched. This is a very desirable feature because the fields are often in poor condition when fertilizer is being distributed and this downward thrust will add to the traction effort of the pulling vehicle rather than detract.

It should also here be noted the many ways in which the compacted manure, as handled in the disclosed embodiment, is reduced to a fine top dressing. As the loading conveyor 87 contacts the manure, the teeth 194 dig into and shred the manure which is deposited on floor 185 over which the manure is moved by the staggered slats into the body of the distributor. To prevent compacting of the manure as it is being moved forwardly in the distributor, the front end of the distributor is increasingly tapered to provide greater capacity and the sides of the distributor are flared out adjacent to the conical slingers 67 and 68. The beater 152 and conical slingers are both provided with spikelike teeth 154 and 149, respectively, to further shred and reduce the manure supplied by the floor conveyor in the distributor and by the time the manure is contacted by the curved slinging blades 147 it has been shredded into a divided state, ideal for even distribution as a top dressing.

It should now be obvious that the apparatus herein disclosed for purposes of illustration comprises a power operated front spreading, rear loading fertilizer distributor wherein the distributor body can be loaded without detaching the distributor from the tractor and in most instances without the operator leaving his position on the tractor, that apparatus embodying the invention is applicable to all types of front spreading fertilizer distributors, and that it is not desired to limit the invention to the exact construction and arrangements of parts herein disclosed, as various modifications within the scope of the appended claims may occur to persons skilled in the art.

In general terms, apparatus incorporating the present invention comprises a vehicle adapted to be hitched to a tractor, and power transmitting means mounted on said vehicle and connectable in driven relation with a rotary power take-off element on said tractor for actuating a manure advancnig floor conveyor, a manure spreading mechanism at the front end of the vehicle body, and a manure loading mechanism at the rear end of the vehicle body. A manually operable control element, which in the illustrated embodiment of the invention is represented by the hand lever 74, is located within reach of an operator on the tractor for starting and stopping operation of said floor conveyor, and another manually operable control element, which in the illustrated embodiment of the invention is represented by the hand lever 86, is located within reach of said operator for starting and stopping the manure loading mechanism. The two control elements represented by the levers 74 and 86, are operable selectively and independently of each other so as to permit operation of the floor conveyor while the loading mechanism is inoperative, or operation of the loading mechanism while the floor conveyor is inoperative, or simultaneous operation of the floor conveyor and loading mechanism.

It is claimed and desired to secure by Letters Patent:

1. A fertilizer distributor, comprising a material confining body including a discharge opening at one end thereof and a material supporting floor terminating adjacent said discharge opening, an endless conveyer operative to move material forwardly through said body and over said floor to said opening, a pair of transversely spaced shaft members mounted on a forward portion of said body for rotation about horizontal longitudinal axes, material impelling blade members secured, respectively, to said shaft members for rotation therewith on said axes and disposed in adjacent opposed material discharging relation to said opening, drive means operable to rotate said shaft members in opposite directions so that said blade members move upwardly in the space between said axes, a transversely extending beater member mounted for rotation in said body immediately to the rear of said opening in spaced elevated relation to said conveyer, drive means operable to rotate said beater member on its axis in a direction such that upper surfaces of said beater member move in a generally forward direction and the upper portion of the material moved by said conveyer is moved over said beater member and onto upper surfaces of said blade members, a shield member mounted on said body in spaced elevated relation to said beater member, said opening and said blade members; said shield member forming a guide for directing material moved over said beater member into contact with said blade members, said shield member coacting with said blade members to provide a substantially continuous uniform sheet of material being distributed downwardly and laterally outward from said opening and in substantially equal distances beyond the opposite sides of said body in a substantially transverse vertical plane, and means for moving said body, for operating said conveyer, and for actuating said drive means for said shaft members and said drive means for said beater member.

2. A fertilizer distributor, comprising a material confining body including a discharge opening at one end thereof and a material supporting floor terminating adjacent said discharge opening, an endless conveyer operative to move material forwardly through said body and over said floor to said opening, a pair of transversely spaced shaft members mounted on a forward portion of said body for rotation about horizontal longitudinal axes, material impelling blade members secured, respectively, to said shaft members for rotation therewith on said axes and disposed in adjacent opposed material discharging relation to said opening, drive means operable to rotate said shaft members in opposite directions so that said blade members move upwardly in the space between said axes, a transversely extending beater member mounted for rotation in said body immediately to the rear of said opening in spaced elevated relation to said conveyer, drive means operable to rotate said beater member on its axis in a direction such that upper surfaces of said beater member move in a generally forward direction and the upper portion of the material moved by said conveyer is moved over said beater member and onto upper surfaces of said blade members, the axes of rotation of said blade members being disposed in a horizontal plane substantially midway between said floor and the axis of rotation of said beater member, a shield member mounted on said body in spaced elevated relation to said beater member, said opening and said blade members; said shield member forming a guide for directing material moved over said beater member into contact with upper surfaces of said blade members to provide a substantially continuous uniform sheet of material being distributed downwardly and laterally outward from said opening and in substantially equal distances beyond the opposite sides of said body in a substantially transverse vertical plane, and means for moving said body, for operating said conveyer, and for actuating said drive means for said shaft members and said drive means for said beater member.

3. In combination, a tractor including a power take-off, and a fertilizer distributor adapted to have its forward portion attached to the rear end of said tractor, said fertilizer distributor comprising a material confining body including a forwardly located discharge opening and a material supporting floor terminating adjacent said opening, an endless conveyer connected in driven relation with said power take-off and operative to move material forwardly through said body and over said floor to said discharge opening, a transversely extending beater member connected in driven relation with said power take-off and mounted for rotation at the forward end of said body immediately to the rear of said opening in spaced elevated relation to said conveyer, a pair of transversely spaced shaft members mounted for rotation about longitudinal axes, and material impelling blade members secured, respectively, to said shaft members for rotation therewith on said axes and disposed in adjacent opposed material discharging relation to said opening, said shaft members being operatively connected with said power take-off for relative rotation in opposite directions so that said blade members move upwardly in the space between said axes, a shield member mounted on the forward end of said body in spaced elevated relation to said beater member and said blade members, said shield member coacting with said blade members to provide a substantially continuous uniform sheet of material being distributed downwardly and laterally outward from said opening in substantially equal distances beyond opposite sides of said body in a substantially transverse vertical plane.

4. In combination, a tractor including a power take-off, and a fertilizer distributor adapted to have its forward portion attached to the rear end of said tractor, said fertilizer distributor comprising a material confining body including a forwardly located discharge opening and a material supporting floor terminating adjacent said opening, an endless conveyer connected in driven relation with said power take-off and operative to move material forwardly through said body and over said floor to said discharge opening, a transversely extending beater member mounted for rotation at the forward end of said body immediately to the rear of said opening in spaced elevated relation to said conveyer, a pair of transversely spaced shaft members mounted for rotation about longitudinal horizontal axes, material impelling blade members secured, respectively, to said shaft members for rotation therewith on said axes and disposed at the forward end of said body in opposed material discharging relation to said opening, said beater member being operatively connected with said power take-off for rotation in a direction about a transverse axis such that upper surfaces thereof move forwardly and a portion of the material moved forward by said conveyer is moved over said beater and onto said blade members, the axes of rotation of said shaft members being disposed in a horizontal plane substantially midway between said floor and the axis of rotation of said beater member, said shaft members being operatively connected with said power take-off for relative rotation in opposite directions so that said blade members move upwardly in the space between said axes, and a shield member mounted on the forward end of said body in spaced elevated relation to said beater member and said blade members, said shield member forming a guide for directing material moved over said beater member into contact with said blade members, and said shield member coacting with said blade members to provide a substantially continuous uniform sheet of material being distributed downwardly and laterally outward from said opening and in substantially equal distances beyond opposite sides of said body in a substantially transverse vertical plane.

5. Apparatus for loading, transporting and spreading manure by means of a tractor, said apparatus comprising: a vehicle having a manure confining body and hitch means at the forward end of the latter adapted for connection with said tractor; a floor conveyer mounted on said vehicle and operative to advance manure forwardly within said body toward a discharge aperture at said forward end of the latter; a spreader mechanism mounted on said vehicle in manure receiving relation to said conveyer and in manure discharging relation to said aperture; an elongated rigid elevator frame pivotally suspended from a top rear portion of said body for vertical swinging movement in rearward depending relation thereto; a spiked endless belt structure operatively trained around said elevator frame; means for transmitting driving power from a rotary power take-off element on said tractor to said floor conveyer, spreader mechanism and belt structure, said power transmitting means including a selectively engageable and disengageable clutch mechanism connected in drive transmitting relation with said floor conveyer, and another selectively engageable and disengageable clutch mechanism connected in drive transmitting relation with said belt structure; and an adjusting mechanism for said elevator frame operatively interposed between the latter and said body and including a load transmitting element adjustably connected with said body and coacting with said elevator frame for selectively lowering the latter to an operative position effecting positive engagement of the lower end of said spiked belt structure with a vehicle supporting compacted manure layer therebeneath; said spiked belt structure being operable when power is transmitted thereto in said operative position of said elevator frame to dig downwardly into said manure layer and convey dug manure upwardly thereover and into said body at said top rear portion of the latter.

6. Apparatus as set forth in claim 5 wherein said adjusting mechanism for said elevator frame comprises a transverse rock shaft journaled on a rear part of said vehicle, an arm fixedly attached to and extending from said rock shaft, a link pivotally connected at one end to the distal end of said arm and pivotally connected at the other end thereof to said elevator frame for raising and lowering the latter by back and forth rotation of said rock shaft, another arm fixedly attached to and extending from said rock shaft, a hydraulic ram mounted on said vehicle and having a reciprocable element operatively connected to the distal end of said second arm, and conduit means for connecting said ram with a source of fluid pressure on said tractor.

7. Apparatus for loading, transporting and spreading manure by means of a tractor, said apparatus comprising: a vehicle having a manure confining body and hitch means at the forward end of the latter adapted for connection with said tractor; a floor conveyer mounted on said vehicle and operative to advance manure forwardly within said body toward a discharge aperture at said forward end of the latter; a spreader mechanism mounted on said vehicle in manure receiving relation to said conveyor and in manure discharging relation to said aperture; an elongated rigid elevator frame pivotally suspended from a top rear portion of said body for vertical swinging movement in rearward depending relation thereto; a spiked endless belt structure operatively trained around said elevator frame; power transmitting means mounted on said vehicle and connectable in driven relation with a power take-off element on said tractor for driving said floor conveyer, spreader mechanism and endless belt structure; a control mechanism for said power transmitting means including a first manually operable control element mounted on said vehicle within reach of an operator on said tractor for starting and stopping operation of the floor conveyer, and a second manually operable control element mounted on said vehicle within reach of an operator on said tractor and operable independently of said first control element for starting and stopping movement of said endless belt structure; and an adjusting mechanism for said elevator frame operatively interposed between the latter and said body and including a load transmitting element adjustably connected with said body and coacting with said elevator frame for selectively lowering the latter to an operative position effecting positive engagement of the lower end of said spiked belt structure with a vehicle supporting compacted manure layer therebeneath; said spiked belt structure being operable when power is transmitted thereto in said operative position of said elevator frame to dig downwardly into said manure layer and convey dug manure upwardly thereover and into said body at said top rear portion of the latter.

CHARLES J. SCRANTON.

References Cited in the file of this patent

UNITED STATES PATENTS

| Number | Name | Date |
|---|---|---|
| 947,277 | Brown | Jan. 25, 1910 |
| 1,291,436 | Dennis | Jan. 14, 1919 |
| 1,924,825 | Young | Aug. 29, 1933 |
| 1,979,945 | Kranick | Nov. 6, 1934 |
| 2,256,655 | Stewart | Sept. 23, 1941 |
| 2,296,474 | Kucera | Sept. 22, 1942 |
| 2,296,909 | Dake | Sept. 29, 1942 |
| 2,311,726 | Blue | Feb. 23, 1943 |
| 2,343,303 | Kuhlman | Mar. 7, 1944 |
| 2,430,020 | Johnson | Nov. 4, 1947 |
| 2,507,669 | Heth | May 16, 1950 |
| 2,581,263 | Lehman | Jan. 1, 1952 |

FOREIGN PATENTS

| Number | Country | Date |
|---|---|---|
| 597,224 | Great Britain | Jan. 21, 1948 |